2,837,382

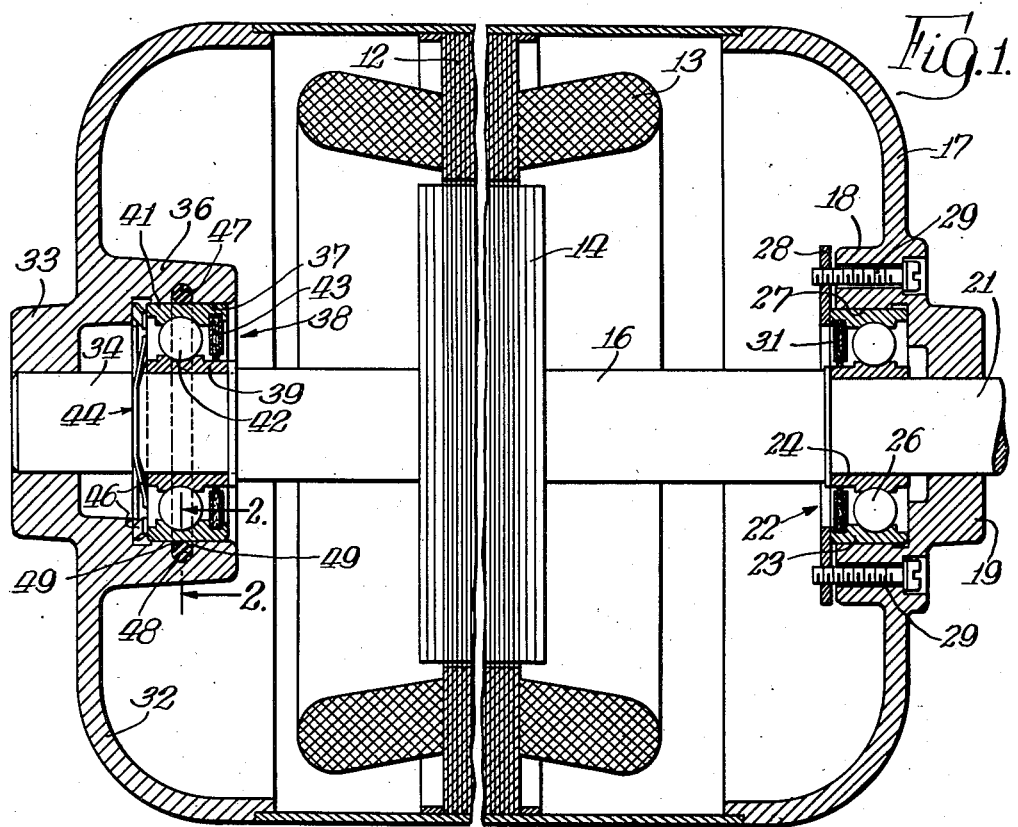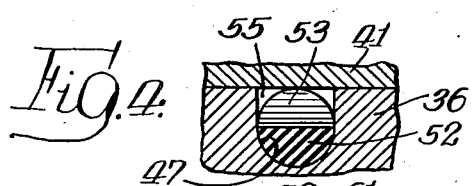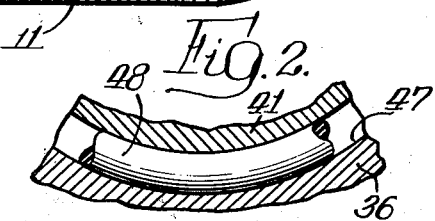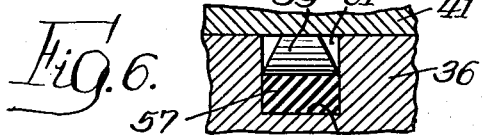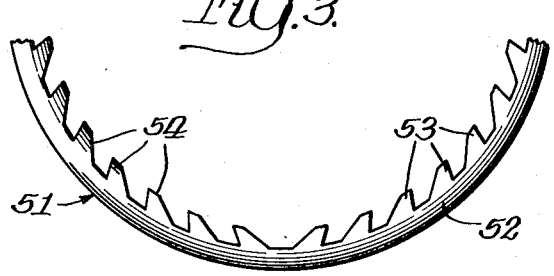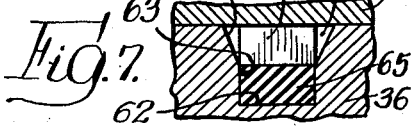
June 3, 1958     E. J. SCHAEFER     2,837,382
BEARING MOUNTING
Filed Feb. 17, 1953
INVENTOR.
Edward J. Schaefer

# United States Patent Office 2,837,382
Patented June 3, 1958

BEARING MOUNTING

Edward J. Schaefer, Fort Wayne, Ind.

Application February 17, 1953, Serial No. 337,271

17 Claims. (Cl. 308—236)

This invention relates to bearing mountings and more particularly to an improved means for preventing rotation of a bearing member relative to its housing.

An anti-friction bearing generally comprises inner and outer bearing races with anti-friction bearing elements, such as balls or rollers, interposed between the races. The inner race is usually rigidly secured to a shaft for rotation therewith, the rigid mounting being effected by means of a lock nut or by press-fitting the inner race on the shaft. It is also desirable to have the outer bearing race fixed with respect to the bearing housing so that there is no play therebetween and also to prevent rotation of the outer race with respect to the housing which would result in wear and increased play in this area.

However, in certain applications of anti-friction bearings, it is necessary to provide at least slight clearance between the outer race of the bearing and its housing so that the bearing is free to move axially in order to accommodate axial expansion and contraction of the shaft. For example, in the case of a ball bearing motor it has been common practice to anchor the outer bearing race securely in the housing at the drive end of the motor shaft, but at the opposite end of the shaft the outer bearing race has been fitted with extremely small clearance in order to accommodate axial expansion and contraction of the motor shaft in response to increases and decreases of the motor temperature. Obviously, the outer bearing races cannot be mounted in fixed relation at both ends of the motor because an excessive thrust would then be exerted on the ball bearings under certain operating conditions.

Although the above-described practice of mounting one of the outer bearing races with sufficient clearance to permit axial movement has been reasonably satisfactory, there are occasional instances where this arrangement has given trouble. For example, if within normal manufacturing tolerances the outer race diameter is at the lower limit and the diameter of the bearing housing is on the upper limit, the resultant clearance between the outer bearing race and the housing is excessive and undesirable rotation of the outer race within its housing is encountered. Such rotation is especially pronounced when a rather heavy device, such as a pump impeller, is mounted on the shaft extension. If this impeller is unbalanced, the rotation of the outer bearing race becomes so pronounced that pounding is accentuated, the housing ultimately wears, and eventually both the housing and the bearing must be replaced.

Accordingly, a primary object of my invention is to provide a novel and improved bearing mounting which overcomes the difficulties heretofore encountered in certain applications of anti-friction bearings.

Another object of the invention is to provide an improved mounting means for a ball bearing or the like which restrains rotation of the outer bearing race relative to its housing but at the same time permits limited axial movement of the bearing relative to the housing.

A further object of the invention is to provide a novel snubbing means for restraining rotation of the outer race of a ball bearing or the like in either direction of rotation.

Other objects and advantages of the invention will become apparent from the subsequent detailed description taken in conjunction with the accompanying drawing, wherein:

Fig. 1 is a longitudinal sectional view through a ball bearing motor and illustrating one specific embodiment of my invention;

Fig. 2 is a fragmentary sectional view on an enlarged scale taken along the line 2—2 of Fig. 1;

Fig. 3 is a fragmentary elevational view showing a modified form of one element of the present invention;

Fig. 4 is a fragmentary cross-sectional view as the modified element of Fig. 3 would look in assembled relation;

Fig. 5 is a fragmentary elevational view of another modification of the same element of the invention;

Fig. 6 is a fragmentary cross-sectional view similar to Fig. 4 but showing the assembled relation of the element of Fig. 5; and Fig. 7 is a fragmentary sectional view showing still another embodiment of the invention.

Referring to Figs. 1 and 2 of the drawing, the invention is illustrated in connection with an electric motor comprising a central housing portion 11 containing a laminated stator core 12 having the conventional stator windings 13. A rotor 14 is disposed in the stator bore and is mounted on a shaft 16 for rotation in the usual manner. An end bell 17 is secured at one end of the central housing 11 and provides a recessed bearing housing 18 and a hub portion 19 through which a drive extension 21 of reduced diameter extends from the shaft 16. A ball bearing unit 22 having an outer race 23 and an inner race 24 with a plurality of anti-friction bearing elements, such as the balls 26, therebetween is disposed within the circular recess, designated at 27, provided by the bearing housing 18. This bearing unit 22 is anchored or locked in fixed relation with respect to its housing by means of an inner clamping ring 28 and a plurality of screws 29 extending through the bearing housing 18 into threaded engagement with the ring 28. By providing a tight fit of the outer bearing race 23 in the recess 27 of the bearing housing 18 and by the clamping action of the ring 28, it will be understood that the outer race is held against rotation and at the same time the entire bearing unit is also held against axial movement. An annular seal 31 is interposed between the inner and outer bearing races 24 and 23 adjacent the inside of the bearing unit 22 in order to prevent loss of lubricant.

At the opposite end of the motor an end bell 32 is secured to the housing 11 and provides a hub portion 33 in which an end portion 34 of reduced diameter extending from the shaft 16 is journaled. The end bell 32 also provides an inwardly extending bearing housing 36 having a recess 37. A ball bearing unit, designated at 38, is likewise provided at this end of the motor and comprises an inner bearing race 39 having a rigid fit on the reduced shaft portion 34 for rotation therewith, an outer bearing race 41, and a plurality of balls 42 therebetween. A sealing ring 43, similar to the ring 31, is also provided in the ball bearing unit 38 for the purpose hereinbefore described.

In order to permit relative axial movement of the bearing unit 38 with respect to the housing 36 as the motor shaft expands and contracts, sufficient clearance is provided between the outer bearing race 41 and the circumferential wall of the recess 37 to allow relatively free axial movement of the outer race. A spring ring 44 having a plurality of resilient fingers 46 is disposed at the base of the recess 37 in the bearing housing 36 and coacts with the outer end of the bearing unit 38 so that the motor shaft 16 is held in predetermined yieldable axial position. However, it will be understood that the resilient fingers 46 on the spring ring 44 will deflect or flex to accommodate axial expansion of the shaft 16 and the consequent axial movement of the bearing unit 38 carried thereon.

Because of the slight annular clearance between the outer bearing race 41 and the housing 36 as described above, a pronounced tendency for the bearing race 41 to rotate within the housing will be encountered in certain instances. This tendency is particularly noticeable when an unbalanced heavy device, such as a pump impeller or the like, is connected to the drive extension 21 of the motor shaft, and under such circumstances rotation of the outer race 41 may be so excessive that the bearing housing is worn and pounding is aggravated during operation of the motor. The principal feature of my invention resides in the provision of a novel means for preventing rotation of the outer bearing race 41 but at the same time permitting axial movement thereof relative to the bearing housing.

According to the invention, this objective is accomplished by providing an annular groove, which may be in either the housing or the outer bearing race, and a resilient ring seated in the groove for coaction between the housing and the outer bearing race to restrain relative rotation of the latter. The resilient ring fits snugly in the base of the annular groove at either the inner or outer periphery of the ring, dependent upon whether the groove is provided in the outer bearing race or the bearing housing, and the ring is also disposed substantially entirely within the groove so that the outer race of the bearing can fit in the recessed housing with the minimum clearance necessary to permit axial movement, thereby avoiding excessive play of the bearing in the housing. However, the important feature of my invention is that the side walls of the groove adjacent the mouth or opening of the groove are slanted or tapered, or alternatively the cross-sectional shape of the resilient ring adjacent the mouth or opening of the groove is transversely curved or tapered so that in either case the ring does not entirely fill the groove in this region. In other words, as will hereinafter appear, the portions of the resilient ring adjacent the interface between the outer bearing race and the housing are transversely spaced from the side walls of the groove so as to provide adequate room for axial deflection and distortion of the ring without interfering with the snug non-rotational engagement between the ring and the coacting bearing and housing members.

Thus, in Figs. 1 and 2 an annular groove 47 is provided around the circumferential wall of the bearing recess 37. The groove 47 has a semi-circular cross-sectional contour at its base, and a rubber ring 48 having a uniform circular cross-section (commonly known as an O ring) is seated snugly in the groove 47. It will be understood that the ring 48 may be made of any suitable resilient material such as natural rubber, synthetic rubber, or other synthetic elastomer. The thickness of the ring 48 is such that the ring is wholly disposed within the groove 47 but is in operative engagement at its inner periphery with the outer surface of the outer bearing race 41. It will be understood that by reason of the gripping characteristics of the resilient ring 48, rotation of the bearing race 41 relative to its housing 36 is effectively prevented in spite of the fact that there is a slight annular clearance between these parts. Because the ring 48 is disposed wholly within the groove 47 and has a transverse circular curvature at its inner periphery adjacent the mouth or annular opening of the groove 47, it will be seen that the inner portion of the ring 48 is transversely spaced from the side walls of the groove 47. In other words, the cross-sectional shape of the ring 48 is such that the ring does not entirely fill the groove 47 adjacent the annular opening of the latter and as a result a small free space 49 (Fig. 1) is provided on each side of the ring 48 in this region. As the motor shaft expands or contracts, the outer bearing race 41 can likewise undergo axial movement relative to the housing 36 and the non-rotational gripping engagement between the ring 48 and the race 41 is not disrupted because the ring 48 is free to undergo limited axial or transverse deflection and thereby bunch up in one or the other of the free spaces 49. Thus, the unique characteristics of my mounting arrangement is that the ring 48 coacts snugly enough between the bearing housing 36 and the bearing race 41 to prevent relative rotation of the latter but at the same time is free to undergo limited axial movement or distortion within the ring groove to accommodate axial expansion of the motor shaft.

In Figs. 3 to 7 there are illustrated modifications of the invention wherein the resilient ring interposed between the bearing housing and the outer bearing race is provided with a plurality of integral projections or teeth extending from the ring for providing improved snubbing or gripping qualities. The teeth or projections may extend from either the inner or outer peripheries of the ring or both, dependent upon the location of the ring groove, but I prefer to have the toothed portion of the ring disposed adjacent the annular opening of the ring groove. Furthermore, either the side walls of the groove are tapered or the teeth of the ring are provided with a transverse cross-sectional curvature or taper for permitting axial deflection of the teeth within the grooves in the same general manner as heretofore described.

Thus, in Figs. 3 and 4 the ring, designated generally at 51, has a semi-circular cross-sectional contour at its outer circumferential half or base 52, and a plurality of teeth 53 and 54 extend integrally from the inner periphery of the ring. To provide an improved snubbing action for preventing rotation of the outer bearing race, it will be seen that the teeth 53 and 54 have a slight slant in a circumferential direction. Furthermore, the teeth 53 at one side of the ring are slanted in one direction while the teeth 54 at the opposite side of the ring are slanted in the opposite circumferential direction so that the ring 51 is highly effective in restraining rotation in either direction. Thus, regardless of the direction of rotation of the motor shaft 16, a toothed snubber ring such as illustrated in Figs. 3 and 4 will provide a highly effective resistance to rotation of the outer bearing race.

It will also be understood from Fig. 4 that the toothed ring 51 is mounted in the same general relation as the ring 48 in Fig. 1, i. e. between the bearing housing 36 and the outer bearing race 41, and as a result the transverse curvature of the teeth 53 and 54 will provide the necessary spacing, as at 55, from the side walls of the groove 47 to permit the desired axial deflection of the teeth 53 and 54 to accommodate axial expansion and contraction of the shaft. It will be appreciated that by reason of the reduced mass of resilient material which must undergo deflection, the projecting teeth 53 and 54 are more readily susceptible to transverse or axial deflection relative to the base portion 52 of the ring than in the case of a ring of uniform circular cross-section such as 48 in Fig. 1.

In Figs. 5 and 6 another modification is shown wherein a ring 56 has an outer peripheral or base portion 57 of rectangular cross-section designed to fit in a ring groove 58 of corresponding shape. The inner periphery of the ring 56 is provided with a plurality of oppositely slanted teeth 59 and 60 integral with the base portion 57 for functioning in the same general manner as the teeth 53 and 54 in the previously described embodiment of the invention. In addition, the teeth 59 and 60 are tapered inwardly at their sides and toward the free or inner ends of the teeth, as seen in Fig. 6, whereby to provide a generally trapezoidal cross-sectional configuration. It will be understood that the inward tapering of the side edges of the teeth 59 and 60 serves the same function as the transverse curvature of the teeth 53 and 54 in Figs. 3 and 4 so that the desired spacing, as at 61, between the teeth and the side walls of the ring groove is provided and the teeth are, therefore, free to undergo axial or transverse deflection.

In Fig. 7, I have illustrated an alternative form of the invention wherein the ring teeth have a uniform rectangular cross-sectional shape but the necessary spacing from the groove walls to permit axial deflection of the teeth is provided by tapering the side walls of the groove. Thus, the bearing housing 36 is provided with a groove 62 in which the side walls are straight, as at 63, adjacent the base of the groove and are tapered outwardly, as at 64, toward the annular mouth or opening of the groove. The rubber ring, designated at 65, has a rectangular cross-section with radially extending teeth 66 also of rectangular cross-section. The base or outer periphery of the ring 65 is snugly seated in the rectangular portion of the groove between the straight side portions 63, and the teeth 66 are transversely spaced from the side wall portions 64 by reason of the tapered conformation of the latter. Thus, the necessary free space, as at 67, is provided on each side of the ring to permit the desired axial deflection of the teeth. This embodiment of the invention wherein the groove walls are tapered affords a highly important economic advantage in that it permits manufacture of the rings 65 by the low cost method of extruding a ribbed tube and then cutting off cross-sections of the tube.

Although it has heretofore been proposed to utilize a resilient rubber ring to prevent relative rotation between a bearing member and its housing, no provision has been made to accommodate axial movement of the bearing relative to its housing. It will be seen that my invention provides a simple and effective arrangement for accommodating the axial shifting movement of the bearing which must be provided in certain instances, such as in the case of electric motors, while at the same time the non-rotational feature of the bearing mounting is enjoyed to the fullest extent.

Although the invention has been described with particular reference to certain specific embodiments thereof, it will be understood that various modifications and equivalent structures may be resorted to without departing from the scope of the invention as defined in the appended claims.

1. In combination, an annular bearing having an inner race and an outer race member with anti-friction bearing elements therebetween, a housing member surrounding said bearing, one of said members having a circumferential groove therein, and a rubber ring having a circumferential portion thereof snugly seated in said groove with an opposite circumferential portion of the ring engaging the other of said members, said ring being disposed substantially completely within said groove over its entire circumference and having a cross-sectional shape such that said opposite circumferential portion of the ring is spaced transversely from the side walls of the groove adjacent the opening of the latter whereby to permit axial deflection of only said opposite circumferential and spaced portion of the ring within said groove for accommodating slight axial movement of said bearing relative to said housing member.

2. In combination, an annular bearing having an inner race and an outer race member with anti-friction bearing elements therebetween, a housing member surrounding said bearing, one of said members having a circumferential groove therein, and a rubber ring having a circumferential portion thereof snugly seated in said groove with an opposite circumferential portion of the ring engaging the other of said members, said ring being disposed substantially completely within said groove over its entire circumference and said groove having its side wall tapered so that said opposite circumferential portion of the ring is spaced transversely from the side walls of the groove adjacent the opening of the latter whereby to permit axial deflection of only said opposite circumferential and spaced portion of the ring within said groove for accommodating slight axial movement of said bearing relative to said housing member.

3. In combination, an annular bearing having an inner race and an outer race member with anti-friction bearing elements therebetween, a housing member surrounding said bearing, one of said members having a circumferential groove therein, and a rubber ring having a circumferential portion thereof snugly seated in said groove with an opposite circumferential portion of the ring engaging the other of said members, said ring being disposed substantially completely within said groove over its entire circumference and the cross-sectional relation between the ring and the groove being such that said opposite circumferential portion of the ring does not entirely fill the outer portion of the groove adjacent the opening of the latter whereby said opposite circumferential portion of said ring is spaced transversely from the side walls of the groove to permit axial deflection of only said opposite circumferential and spaced portion of the ring within said groove for accommodating slight axial movement of the bearing relative to said housing member.

4. In combination, an annular bearing having an inner race and an outer race member with anti-friction bearing elements therebetween, a housing member surrounding said bearing, one of said members having a circumferential groove therein, and a rubber ring having a circumferential portion thereof snugly seated in said groove with an opposite circumferential portion of the ring engaging the other of said members, said ring having a substantially uniform circular cross-section and being disposed substantially completely within said groove over its entire circumference, said opposite circumferential portion of said ring being spaced transversely from the side walls of said groove adjacent the opening of the latter by reason of the circular cross-sectional shape of the ring whereby to permit axial deflection of only said opposite circumferential and spaced portion of the ring within said groove for accommodating slight axial movement of said bearing relative to said housing member.

5. In combination, an annular bearing having inner and outer races with anti-friction bearing elements therebetween, a housing surrounding said bearing and having a circumferential groove therein, and a rubber ring having its outer circumferential portion snugly seated in said groove with its inner circumferential portion engaging the outer surface of said outer race, said ring having a substantially uniform circular cross-section and being disposed substantially completely within said groove over its entire circumference, and said inner circumferential portion of said ring being spaced transversely from the side walls of the groove adjacent the opening of the latter by reason of the circular cross-sectional shape of the ring whereby to permit axial deflection of only said inner circumferential and spaced portion of the ring within said groove for accommodating slight axial movement of the bearing relative to the housing.

6. In combination, an annular bearing having an inner race and an outer race member with anti-friction bearing elements therebetween, a housing member surrounding said bearing, one of said members having a circumferential groove therein, and a ring of resilient material seated in said groove and having a plurality of integral teeth extending from at least one of its inner and outer peripheries into contact with the other of said members, said ring being disposed substantially completely within said groove over its entire circumference and the toothed portion of said ring in cross-section being spaced transversely from the side walls of the groove adjacent the opening of the latter whereby to permit axial deflection of said teeth within said groove for accommodating slight axial movement of said bearing relative to said housing member.

7. In combination, an annular bearing having an inner race and an outer race member with anti-friction bearing elements therebetween; a housing member surrounding said bearing, one of said members having a circumferential groove therein, and a ring of resilient material seated in said groove and having a plurality of integral teeth extending from at least one of its inner and outer peripheries into contact with the other of said members, said ring being disposed substantially completely within said groove over its entire circumference and having a cross-sectional shape such that the toothed portion of the ring is spaced transversely from the side walls of the groove adjacent the opening of the latter whereby to permit axial deflection of said teeth within said groove for accommodating slight axial movement of said bearing relative to said housing member.

8. The structure of claim 7 further characterized in that a portion of said teeth are slanted circumferentially in one direction and the remaining teeth are slanted circumferentially in the opposite direction whereby to prevent rotation of the outer race member relative to the housing member in either direction.

9. The structure of claim 7 further characterized in that said teeth have a transverse curvature whereby to provide the desired spaced relationship between the teeth and the side walls of said groove.

10. The structure of claim 7 further characterized in that said teeth have a trapezoidal cross-sectional shape with the sides of the teeth tapering inwardly toward their outer ends whereby to provide the desired spaced relationship between the teeth and the side walls of said groove.

11. In combination, an annular bearing having inner and outer races with anti-friction bearing elements therebetween, a housing surrounding said bearing and having a circumferential groove therein, and a ring of resilient material seated in said groove and having a plurality of integral teeth extending from the inner periphery of the ring into engagement with the outer surface of said outer race, said ring being disposed substantially completely within said groove over its entire circumference and having a cross-sectional shape such that the toothed portion of the ring is spaced transversely from the side walls of the groove adjacent the opening of the latter whereby to permit axial deflection of said teeth within said groove for accommodating slight axial movement of said bearing relative to said housing.

12. The structure of claim 11 further characterized in that the outer portion of said ring seated in said groove has a substantially semi-circular cross-sectional shape and said teeth have a transverse curvature whereby to provide the desired spaced relationship between the teeth and the side walls of said grooves.

13. The structure of claim 11 further characterized in that the outer portion of said ring seated in said groove has a rectangular cross-sectional shape and the sides of said teeth are tapered inwardly toward the outer ends of the teeth whereby to provide the desired spaced relationship between the teeth and the side walls of said groove.

14. In combination, an annular bearing having an inner race and an outer race member with anti-friction bearing elements therebetween, a housing member surrounding said bearing, one of said members having a circumferential groove therein, and a ring of resilient material seated substantially completely within said groove over its entire circumference and having a plurality of integral teeth extending from at least one of its inner and outer peripheries into contact with the other of said members; said ring having a rectangular cross-sectional shape including said teeth and said groove having its side walls tapered so that the toothed portion of the ring is spaced transversely from the side walls of the groove adjacent the opening of the latter whereby to permit axial deflection of said teeth within said groove for accommodating slight axial movement of said bearing relative to said housing member.

15. In combination, an annular bearing having inner and outer races with anti-friction bearing elements therebetween, a housing surrounding said bearing and having a circumferential groove therein, and a ring of resilient material seated in said groove and having a plurality of integral teeth extending from the inner periphery of the ring into engagement with the outer surface of said outer race, said ring being disposed substantially completely within said groove over its entire circumference and having a rectangular cross-sectional shape including said teeth and said groove having its side walls tapered so that the toothed portion of the ring is spaced transversely from the side walls of the groove adjacent the opening of the latter whereby to permit axial deflection of said teeth within said groove for accommodating slight axial movement of said bearing relative to said housing.

16. In combination, a housing member having a circular recess therein, a bearing in said recess having an inner race and an outer race member with anti-friction bearing elements therebetween, one of said members having a circumferential groove therein, a shaft extending axially through said recess and having said inner race rigidly mounted thereon, a rubber ring having a circumferential portion thereof snugly seated in said groove with an opposite circumferential portion of the ring engaging the other of said members for preventing relative rotation therebetween, and resilient means operatively interposed between the base of said recess and said bearing for yieldably holding said shaft in predetermined axial position; said opposite circumferential portion of said ring being spaced from the side walls of said groove adjacent the opening of the latter whereby to permit axial deflection of only said opposite circumferential and spaced portion of the ring within said groove for accommodating slight axial movement of the bearing relative to the housing member due to axial expansion of said shaft against the action of said resilient means.

17. A bearing mounting member comprising an integral one-piece ring of resilient material having a plurality of teeth projecting integrally therefrom, said ring being adapted to be interposed in an annular groove in one of a pair of concentric bearing race and housing members for gripping coaction with said members to restrain relative rotation therebetween, and certain of said teeth being slanted circumferentially in one direction and the remaining teeth being slanted circumferentially in the opposite direction for restraining relative rotation in either direction.

References Cited in the file of this patent

UNITED STATES PATENTS

| | | |
|---|---|---|
| 1,828,136 | Freedlander | Oct. 30, 1931 |
| 2,101,346 | Robertson | Dec. 7, 1937 |
| 2,397,312 | Forrest | Mar. 26, 1946 |
| 2,473,267 | Wightman | June 14, 1949 |
| 2,504,776 | Woodfield et al. | Apr. 18, 1950 |
| 2,650,866 | Knudson | Sept. 1, 1953 |
| 2,653,063 | Arndt et al. | Sept. 22, 1953 |
| 2,674,012 | Noelting | Apr. 6, 1954 |

FOREIGN PATENTS

| | | |
|---|---|---|
| 105,388 | Sweden | Sept. 1, 1942 |
| 645,401 | Great Britain | Nov. 1, 1950 |